No. 822,911. PATENTED JUNE 12, 1906.
E. BOMMER.
SPRING HINGE.
APPLICATION FILED MAR. 2, 1905.
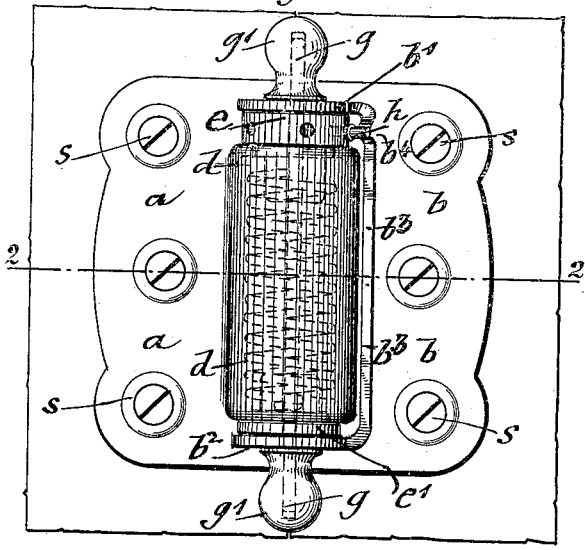
Fig. 1.
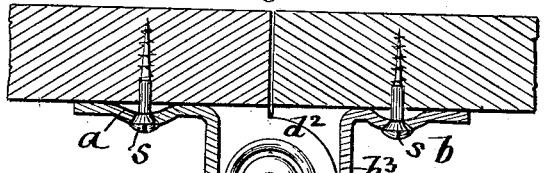
Fig. 2.
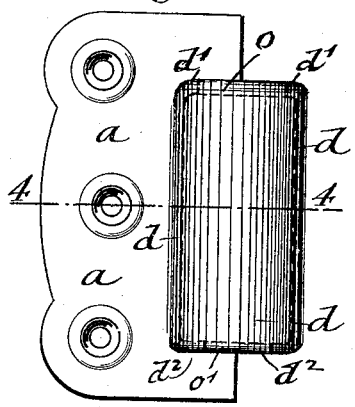
Fig. 3.
Fig. 4.
Fig. 7.
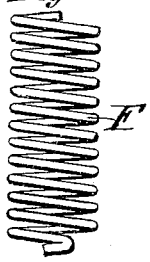
Fig. 8.
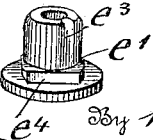
Fig. 9.
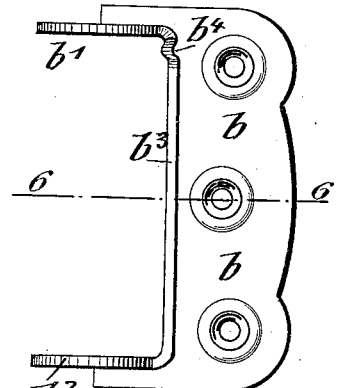
Fig. 5.
Fig. 6.
Witnesses
Henry J. Suhrbier.
Inventor
Emil Bommer
By his Attorneys
Gowel & Niles

UNITED STATES PATENT OFFICE.

EMIL BOMMER, OF NEW YORK, N. Y.

SPRING-HINGE.

No. 822,911.     Specification of Letters Patent.     Patented June 12, 1906.

Application filed March 2, 1905. Serial No. 248,127.

*To all whom it may concern:*

Be it known that I, EMIL BOMMER, a citizen of the United States, residing in New York, borough of Brooklyn, and State of New York, have invented certain new Improvements in Spring-Hinges, of which the following is a specification.

This invention relates to spring-hinges, and has for its object to provide an improved spring-hinge especially adapted for screen-doors.

To this end the invention consists in the novel features and combinations of parts to be hereinafter described and claimed.

In the accompanying drawings, Figure 1 represents a front elevation of my improved spring-hinge. Fig. 2 is a horizontal section of the same on line 2 2, Fig. 1. Figs. 3 and 4 are respectively a detail front elevation and a horizontal section on line 4 4, Fig. 3, of one leaf and the spring-barrel applied to the same. Figs. 5 and 6 are respectively a front elevation of the second leaf and a horizontal section on line 6 6, Fig. 5, of the same; and Figs. 7, 8, and 9 are respectively a side view of the adjustable tension-collar, a side elevation of the coiled spring, and a perspective view of the fixed tension-collar.

Similar letters of reference indicate corresponding parts in different figures of the drawings.

Referring to the drawings, $a$ represents one leaf, and $b$ the other leaf, of the improved spring-hinge. The spring-barrel $d$ is made integral with leaf $a$ and stamped, by means of suitable dies, from a piece of sheet metal, preferably sheet-bronze, of suitable thickness. The spring-barrel $d$ projects first in straight direction from the body of the leaf and is then curved approximately in a semicircle, leaving the part adjacent to the leaf open. The upper and lower ends $d'$ $d^2$ of the spring-barrel $d$ are bent inwardly, so as to form seats for the tension-collars, the upper seat having a circular opening $o$ and the lower seat $d^2$ a square opening $o'$, as shown in Fig. 4. The second leaf $b$ is provided with perforated horizontal ears $b'$ $b^2$, which are bent up at right angles to the body of the leaf $b$ and connected by a forwardly-projecting flange $b^3$, which is bent up along the inner edge of the leaf, as shown in Figs. 5 and 6. Both leaves $a$ and $b$ are attached by fastening-screws $s$ $s'$ to the door-casing and door, respectively. Into the seats at the ends of the spring-barrel $d$ are inserted an upper adjustable tension-collar $e$ and a lower fixed tension-collar $e'$. The inwardly-bent ends of a helical spring F are inserted into the recessed holders $e^2$ $e^3$ of the tension-collars in the well-known manner. A pintle $g$, which is provided with screw tips or terminals $g'$ at its ends, is passed centrally through the perforated ears $b'$ $b^2$, tension-collars $e$ $e'$, coil-spring F, and the seats at the ends of the barrel and held in place by the screw tips or terminals $g'$. The fixed tension-collar $e'$ is provided with a square boss $e^4$ between its outer flange and its recessed spring-holder $e^3$, as shown in Fig. 9. This boss $e^4$ is inserted into the square opening $o'$ of the lower seat $d^2$ of the barrel of the leaf $a$, so that the tension-collar $e'$ is thereby supported rigidly in position without requiring an exterior fastening or connection between the spring-barrel $d$ and the tension-collar $e'$.

For assembling the parts of the spring-hinge the fixed tension-collar $e'$ with its its square boss is placed in position in the square opening in the seat at the bottom of the spring-barrel and the inner recess of the spring-holder connected with the lower end of the coil-spring F. The adjustable tension-collar $e$ is then seated in the upper end of the spring-barrel and connected with the upper end of the coil-spring. The ears of the leaf $b$ are then placed over the tension-collars and the pintle $g$ passed through the ears, tension collars, spring, and barrel, and the terminals $g'$ then screwed down on the ends of the pintle. A stop-pin $h$ is then inserted into one of the holes in the adjustable tension-collar $e$ after the coil-spring is set to proper tension by a suitable lever inserted into one of the remaining holes of the adjustable tension-collar and seated in a recess $b^4$ in the forwardly-projecting flange $b^3$ of the leaf $b$, as shown in Fig. 1.

As the barrel on one leaf and the forwardly-projecting flange on the other leaf inclose the coil-spring, it is out of sight when the door is closed.

The hinge can be manufactured at comparatively small cost and combines a neat and finished appearance with great strength and durability, so as to comply more fully with the requirements of the better style of screen and other doors.

Having thus described my invention, I claim as new and desire to secure by Letters Patent—

In a screen-door spring-hinge, the combination of a leaf provided with a semicircular spring-barrel having inwardly-bent upper and lower ears or seats, one of said seats being provided with a circular opening and the other with a square opening, a second leaf provided with bent-up perforated ears extending over said first-named ears, tension-collars interposed between the corresponding ears of said spring-barrel and said last-named ears, one of said collars being rotatable in said circular opening and the other provided with an intermediate square boss engaging said square opening, and a pintle passing through the ears of said leaves and through said tension-collars.

In testimony that I claim the foregoing as my invention I have signed my name in presence of two subscribing witnesses.

EMIL BOMMER.

Witnesses:
PAUL GOEPEL,
HENRY J. SUHRBIER.